United States Patent [19]

Kawase et al.

[11] Patent Number: 4,753,908
[45] Date of Patent: Jun. 28, 1988

[54] METHOD FOR PRODUCTION OF MICROPOROUS SEPARATING MATERIAL FROM SMECTITE TYPE MINERAL

[75] Inventors: Kaoru Kawase; Hiroshi Sakami, both of Nagoya; Kenzi Suzuki, Ohkuchimachi Yono; Shozo Iida, Nagoya, all of Japan

[73] Assignees: Agency of Industrial Science; Ministry of International Trade & Industry, both of Tokyo, Japan

[21] Appl. No.: 940,087

[22] Filed: Dec. 10, 1986

[30] Foreign Application Priority Data

Dec. 10, 1985 [JP]  Japan ................. 60-278592
Dec. 10, 1985 [JP]  Japan ................. 60-278593
Dec. 10, 1985 [JP]  Japan ................. 60-278594

[51] Int. Cl.$^4$ .................... B01J 21/16; B01J 20/12
[52] U.S. Cl. ...................... 502/63; 264/44; 501/82; 502/62; 502/82
[58] Field of Search ............ 502/62, 63, 80, 86, 502/87; 501/81, 82; 264/44, 110; 106/DIG. 3

[56] References Cited

U.S. PATENT DOCUMENTS 4,510,257  4/1985  Lewis et al. ................. 502/63
4,629,713  12/1986  Suzuki et al. ................ 502/84

FOREIGN PATENT DOCUMENTS 67340   4/1983  Japan .................. 502/63
137813  7/1985  Japan .................. 502/80
155526  8/1985  Japan .................. 502/84
166217  8/1985  Japan .................. 502/84

Primary Examiner—Paul E. Konopka
Attorney, Agent, or Firm—Oblon, Fisher, Spivak, McClelland & Maier

[57] ABSTRACT

A microporous separating material is produced by a method which comprises preparing a mixture of (1) macromolecular quaternary ammonium salt having a quaternary amine linked to a water-soluble macromolecular compound and possessing basicity, (2) a polymer of a polyoxyethylene alkylvinyl monomer and a vinyl monomer possessing basicity, or (3) a polymer of a halogenide of a quaternary amine, i.e. a basic macromolecular compound, and at least one water-soluble macromolecular substance selected from the group consisting of cellulose, polyvinyl alcohol, polyethylene oxide, and polyacrylamide with a smectite type mineral, mixing the aforementioned mixture with an inorganic substance in a water-soluble state, drying the resulting mixture, and firing the dried mixture.

6 Claims, No Drawings

METHOD FOR PRODUCTION OF MICROPOROUS SEPARATING MATERIAL FROM SMECTITE TYPE MINERAL

FIELD OF THE INVENTION AND RELATED ART STATEMENT

This invention relates to a method for the production of a microporous separating material composed mainly of smectite type mineral and containing pores of diameters exceeding 3 nanometers. Smectite type minerals include montmorillonite, bentonite, chlorite, beidellite, hectorite, and synthetic mica.

These minerals share common properties. These properties will be described below with respect to montmorillonite by way of example. Montmorillonite has silica tetrahedron-alumina octahedron-silica tetrahydron trilaminar structures superposed repeatedly to form one layer of crystals. The crystals of the aforementioned alumina octahedrons from a negatively charged layer because part of the alumina thereof is substituted with magnesium of a small electric charge. The alkali metal ions corresponding to the negative charge intervene between one layer of triple crystalline structure and another layer of triple crystalline structure and neutralize the charge of the layer surface. Thus, montmorillonite possesses a large cation-exchange capacity. The interfacial layers between the crystal layers absorb water by the hydration of $Na^+$ and swell notably. Owing to these special properties, montmorillonite has found utility as a raw material for the production of porous substances which are used as a catalyst, an adsorbent, and a separating agent.

With the aim of utilizing the special properties of such minerals, the inventors perfected a method for the production of a finely porous clay using these minerals and filed a patent application on the invention with the U.S. Patent and Trademark Office under U.S. Ser. No. 691,765. This earlier invention concerns a finely porous clay comprising crystal layers of a smectite type mineral separated by intervals of not less than 20 Å and an inorganic substance and optionally a water-soluble polymer embraced between said crystal layers, and a method for the production of said finely porous clay comprising mixing a smectite type mineral, a water-soluble polymer, one member selected from the group consisting of silica colloidal and water glass, at least one cation, and water and subsequently removing the water-soluble polymer from the resultant mixture. In said invention, usable water-soluble polymers are limited to starch, konjak, agar, grated yam, gum arabic, glude, gelatin, polyethylene oxide, polyvinyl alcohol, polyacrylic acid derivatives, polyvinyl sulfonic acid derivatives, and carboxycellulose derivatives.

In the method of production described above, the silica colloidal intervenes between the crystal layers of smectite mineral and the water-soluble polymer plays the part of increasing the interfacial intervals between the layers.

The invention of the aforementioned U.S. patent application, however, has the following disadvantage because the water-soluble polymer is limited as described above. The surface of the smectite mineral and that of the inorganic substance are equally charged negatively and, therefore, repel each other and the positive charge at the edge of the smectite mineral and the negative charge of the inorganic substance attract each other. Thus, the inorganic substances are present not merely in the interfacial intervals but also around the particles formed by the layer stacks. Thus, the produced porous clay possesses a complicated structure. Because of its structural complexity, the porous clay inevitably contains micropores of diameters distributed over a wide range. It is therefore not suited for use as a separating material for separation of molecules of a specific diameter or as a catalyst for the production of specific molecules.

OBJECT AND SUMMARY OF THE INVENTION

The inventors made various studies for the purpose of overcoming the drawback of the prior art as described above. They have consequently found that this drawback can be completely overcome by using, in place of the aforementioned water-soluble polymer, a mixture of (1) molecular quaternary ammonium salt having a quaternary amine linked to a water-soluble macromolecular compound and possessing basicity, (2) a polymer of a polyoxyethylene alkylvinyl monomer and a vinyl monomer possessing basicity, or (3) a polymer of a halogenide of a quaternary amine, i.e. a basic macromolecular compound, and at least one water-soluble macromolecular substance selected from the group consisting of cellulose, polyvinyl alcohol, polyethylene oxide, and polyacrylamide. The present invention has been perfected as a result.

To be specific, this invention is directed to a method for the production of a microporous separating material, which method comprises mixing one macromolecular substance selected from the macromolecular substances defined in (1), (2), and (3) above with at least one inorganic substance selected from the group consisting of silica colloidal and antimony oxide in a water-soluble state, then stirring the resulting mixture with a smectite type mineral added thereto, drying the produced mixture, and firing the dried mixture.

DETAILED DESCRIPTION OF THE PREFERRED EMBODIMENT

In accordance with the present invention, the aforementioned inorganic substance is stirred in the solution of the macromolecular substance defined in (1), (2), or (3). While the two substances are being mixed by stirring, the anion on the surface of the inorganic substance and the cation of the basic macromolecular substance react with each other and the surface of the inorganic substance is consequently coated with a water-soluble macromolecular substance. As a result, the negative charge originally present on the inorganic substance is changed to a positive charge.

Then, the smectite type mineral is added to the solution of the macromolecular substance to which the inorganic substance has been added. Generally, the smectite type mineral is added in a form mixed with water. When the solution containing the added mineral is thoroughly stirred, the inorganic substance is introduced into the interfacial intervals between the crystal layers of the smectite type mineral. This introduction of the inorganic substance is enabled by the reaction between the negative charge of the smectite type mineral and the positive charge of the inorganic substance. As a result, the inorganic substance which has entered the interfacial intervals between the adjacent crystal layers of the smectite type mineral serves to prevent the interfacial intervals from shrinkage.

The smectite type mineral has the interfacial intervals thereof widened with water. The amount of water incorporated in the mixture, therefore, is required to be at least 0.4 ml per g. of the mineral. The upper limit of the amount of the water so added is fixed at 30 ml from the practical point of view.

The amount of the inorganic substance to be used desirably falls in the range of 0.01 to 10% by weight based on the smectite type mineral.

The reason for this particular range is that the inorganic substance is not sufficiently distributed in the interfacial intervals between the crystal layers of the smectite type mineral and the produced material does not acquire microporosity throughout the entire volume thereof when the amount is less than the lower limit of the range and the inorganic substance fills up the interfacial intervals between the crystal layers of the smectite type mineral and the produced material does not acquire microporosity when the amount exceeds the upper limit of the range.

Now, the macromolecular substances defined in (1), (2), and (3) and used selectively in the method of this invention will be specifically described below.

The macromolecular substance of (1) is a macromolecular quaternary ammonium salt which has a quaternary amine linked to a water-soluble macromolecular substance selected from among chitosan as a natural macromolecular substance and polyacrylamide, polyvinyl pyridine, polyvinyl, pyrrolidone, polyvinyl alcohol, and polyethylene oxide as synthetic macromolecular substances. From the group of macromolecular quaternary ammonium salts meeting the aforementioned definition, at least one member is selected for use in this invention.

The number of exchange ions possessed by the selected macromolecular substance is desired to fall in the range of 1 to 1,000 per the molecular weight, $1 \times 10^4$, of the substance. The amount of the macromolecular substance is desired to fall in the range of 0.1 to 20% by weight based on the amount of the inorganic substance.

If the number of exchange ions is smaller than 1, the amount of the macromolecular substance to be required for the negative charge of the inorganic substance wholly converted into the positive charge is too large for the production to be practicable. When this number is larger than 1,000 even if all of the negative charge of the smectite type mineral should be converted into positive charge, some of the exchange ions will survive the conversion and as a result of the remaining (unconverted) exchange ions the negative charge of the inorganic substance will be converted into the positive charge. As a result, the smectite type mineral and the inorganic substance will both be charged positively and repel each other so that the inorganic substance will be able to enter the interfacial intervals between the crystal layers. If the amount of the macromolecular substance is less than 0.1% by weight, the introduction of the inorganic substance is attained only with difficulty because the macromolecular substance is not sufficiently effective in widening the interfacial intervals of the smectite type mineral. If this amount is larger than 20% by weight, the macromolecular substance occurring in a large amount in the crystal layers of the smectite type mineral prevents formation of micropores and consequent production of a microporous material.

The macromolecular substance of (2) is a polymer of a polyoxyethylene alkylvinyl monomer and a basic vinyl monomer. To be specific, the polyoxyethylene alkylvinyl monomer is represented by the general formula:

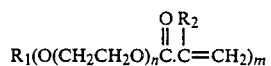

In this formula, $R_1$ stands for an alkyl group such as $CH_3$, $CH_2-CH_3$, $CH_2-CH_2-CH_3$, $CH_3C_6H_5$, or $(CH_3)_2C_6H_5$, $R_2$ stands for H or $CH_3$, n stands for an integer of the value of 10 to 1,000, and m stands for an integer of the value of 1 or 2. The vinyl monomer possessing basicity is represented by the general formula:

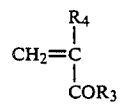

In this formula, $R_3$ stands for a chlorine-containing compound such as $ON(CH_3)_3Cl$, $OC_2H_4N(CH_3)_3Cl$, or $NHC_3H_6N(CH_3)_3Cl$, or $ON(CH_3)_2CH_2CH_2OH.OH$, $OC_2H_4N(CH_3)_2CH_2CH_2OH.OH$, or $NHC_3H_6N(CH_3)_2CH_2CH_2OH.OH$ and $R_4$ stands for H or $CH_3$.

The water-soluble macromolecular substance possessed of basicity is obtained by polymerizing at least one of the aforementioned group of vinyl monomers possessed of basicity. The number of exchange ions possessed by this macromolecular substance is desired to fall in the range of 1 to 1,000 based on the molecular weight, $1 \times 10^5$, of the substance. The amount of the macromolecular weight to be used is desired to fall in the range of 0.1 to 20%. The reason for this range is the same as that for the macromolecular substance of (1). The basic macromolecular substance is synthesized by placing a polyoxyethylene alkylvinyl monomer, a vinyl monomer possessed of basicity, and an initiator in a solvent such as water and heating the resulting solution thereby inducing copolymerization of the monomer therein.

The macromolecular substance of (3) is a polymer of a basic macromolecular substance as a water-soluble macromolecular substance. Examples of the macromolecular substance possessed of basicity include halogenides of quaternary amine such as pyridinium butyl bromide, trimethylaminoethyl acrylate ammonium chloride, and trimethylaminopropyl acrylamide ammonium chloride, homopolymer of ethyleneimine, and copolymers of the aforementioned compounds with such water-soluble monomers as acrylamide, vinyl pyrrolidone, vinyl pyridine, dimethylaminoethyl acrylate, and hydroxyethyl acrylate which are neutral in aqueous solutions. Optionally, a plurality of these basic macromolecular bubstances may be used simultaneously.

Examples of the water-soluble macromolecular substance include such natural compounds as cellulosic compounds and such synthetic compounds as polyvinyl alcohol, polyethylene oxide, and polyacryl amide. This invention does not discriminate among water-soluble macromolecular substances by the manner of production, i.e. natural or synthetic, but requires the substance to be of neutral electric charge when dissolved in water.

When the homopolymer of the macromolecular substance possessed of basicity is adopted in this case, a mixed solution is prepared by combining the basic macromolecular substance with a water-soluble macromolecular substance. As concerns the proportions and concentrations of the two molecular substances in the mixed solution, the amount of the basic macromolecular substance is desired to fall in the range of 0.1 to 50% by weight based on the amount of the water-soluble macromolecular substance and the concentration of the macromolecular substances in the mixed solution is desired to all in the range of 1% to 10%. In the case of a copolymer, the amount of trimethylaminoethyl acrylate is desired to fall in the range of 0.1 to 50% by weight based on acrylamide, for example. The mixed solution is obtained by adding the aforementioned water-soluble macromolecular substance to the solution mentioned above.

The aqueous solution containing the macromolecular substance, the inorganic substance, and the smectite type mineral is dried at a temperature in the range of 30° to 110° C. and then the resulting dried mixture is fired at a temperature in the range of 300° to 1,000° C. In consequence of this treatment, the smectite type mineral and the particles of the inorganic substance are bound together to give rise to a microporous separating material having the crystal layers of the smectite type mineral separated by interfacial intervals of a large width.

In the production of the microporous separating material, since this invention uses a specific basic macromolecular substance as described above unlike the conventional method, the produced material acquires a laminar structure wherein the interfacial intervals separating the crystal layers have a width proportional to the size of the particles of the inorganic substance. Thus, the method of the present invention permits production of a microporous material containing pores of a diameter suiting the particular purpose of application.

The product of this invention, when tested by the nitrogen adsorption-desorption method, is found to contain pores of diameters of not less than 3 nanometers and have a total surface area of about 300 to 400 $m^2/g$ and a nitrogen capacity of about 0.1 to 0.4 ml/g.

The microporous separating material of this invention is useful as a material for the separation of liquids and gases and as a carrier for adsorbents and catalysts.

Now, the present invention will be described more specifically below with reference to working examples.

EXAMPLE 1

In 5 ml of an aqueous 5% silica colloidal (produced by Shokubai Kasei of Japan and marketed under product code "No. SI-350") solution, 5 ml of an aqueous 4% solution of polyvinyl alcohol quaternary trimethylammonium chloride (ion-exchange capacity 105 meq./100 g.) synthesized by using polyvinyl alcohol (polymerization degree 500), monochloroacetic acid, and trimethyl amine was stirred to induce reaction. The resulting reaction solution and a mixed solution consisting of 4 ml of water and 1 g of sodium montmorillonite were mixed by stirring. The resulting mixture was dried in a drier at 110° C. for one day to obtain a dried mixture. This dried mixture was fired at 500° C. for 3 hours to produce a fired mass. The dried mixture and the fired mass were tested by the nitrogen adsorption-desorption method for pore diameter, surface area, nitrogen capacity, specific volume, and porosity. Consequently, the pore diameter was found to be 3.0 and 3.1 nanometers, the surface area to be 285 and 294 $m^2/g$ for the pore diameter of not less than 2 nanometers, the total surface area to be 430 and 452 $m^2/g$, the nitrogen capacity to be 0.22 and 0.25 $cm^3/g$, the specific volume to be 0.50 and 0.55 $cm^3/g$, and the porosity to be 0.44 and 0.46, respectively.

EXAMPLE 2

In 5 ml of an aqueous 5% silica colloidal (produced by Shokubai Kasai of Japan and marketed under product code "No. SI-350) solution, 5 ml of an aqueous 5% solution of polyoxyethylene quaternary trimethylammonium chloride (ion-exchange capacity 118 meq./100 g.) synthesized by using polyethylene oxide (polymerization degree 1,000), epichlorohydrin, and trimethyl amine was stirred to induce reaction. The resulting reaction solution and a mixed solution consisting of 4 ml of water and 1 g of sodium montmorillonite were mixed by stirring. The resulting mixture was dried at 110° C. for 1 day and the dried mixture was then fired at 500° C. for 3 hours. The fired mass consequently obtained was tested by the nitrogen adsorption-desorption method for pore diameter, surface area, nitrogen capacity, specific volume, and porosity. Consequently, the pore diameter was found to be 2.8 nanometers, the surface area to be 280 and 288 $m^2/g$ for the pore diameter of not less than 2 nanometers, the total surface area to be 485 $m^2/g$, the nitrogen capacity to be 0.27 $cm^3/g$, the specific volume to be 0.51 $cm^3/g$, and the porosity to be 0.53.

EXAMPLE 3

In 10 ml of an aqueous 2% silica colloidal (produced by Shokubai Kasei of Japan and marketed under product code "No. SI-350") solution, 5 ml of an aqueous 5% solution of polyvinyl alcohol quaternary trimethylammonium chloride (ion-exchange capacity 288 meq./100 g.) synthesized by using polyvinyl alcohol (polymerization degree 500), monochloroacetic acid, and trimethyl amine was stirred to induce reaction. The resulting reaction solution and a mixed solution consisting of 5 ml of water and 1 g of sodium montmorillonite were mixed by stirring. The mixture consequently obtained was dried at 110° C. for 1 day and then the dried mixture was fired at 500° C. for 3 hours. The fired mass was tested for pore diameter, surface area, nitrogen capacity, specific volume, and porosity. Consequently, the pore diameter was found to be 3.0 nanometers, the surface area to be 288 $m^2/g$ for the pore diameter of not less than 2 nanometers, the total surface area to be 425 $m^2/g$, the nitrogen capacity to be 0.23 $cm^3/g$, the specific volume to be 0.44 $cm^3/g$, and the porosity to be 0.52.

EXAMPLE 4

In 5 ml of an aqueous 5% silica colloidal (produced by Shokubai Kasei of Japan and marketed under product code "No. SI-350") solution, 5 ml of an aqueous 5% solution of polyacrylamide quaternary trimethylammonium chloride (ion-exchange capacity 128 meq./100 g.) synthesized by using polyacrylamide (polymerization degree 400) and methyl chloride was stirred to induce reaction. The resulting reaction solution and a mixed solution consisting of 5 ml of water and 1 g of sodium montmorillonite were stirred. The resulting mixture was dried at 110° C. for 1 day. Then, the dried mixture was fired at 500° C. for 3 hours. The fired mass consequently obtained was tested for pore diameter, surface area, nitrogen capacity, specific volume, and porosity. Consequently, the pore diameter was found to be 3.1 nanometers, the surface area to be 288 $m^2/g$ for the pore diameter of not less than 2 nanometers, the total surface area to be 380 $m^2/g$, the nitrogen capacity to be 0.24 cm$^3$/g, the specific volume to be 0.41 cm$^3$/g, and the porosity to be 0.58.

EXAMPLE 5

In 100 ml of an aqueous 10% methanol solution, 2 g of polyoxyethylene acrylate having a molecular weight of 1,000 and 0.2 g of trimethylaminoethyl acrylate quaternary ammonium chloride were dissolved and then 0.05 g of ammonium persulfate was dissolved. Then, the resulting solution was left standing for reaction at 80° C. for 3 hours. The resulting reaction solution was poured into 1,000 ml of methanol to induce precipitation. The precipitate was separated by filtration and then dried to give rise to a copolymer (ion-exchange capacity 300 meq./100 g.). In 5 ml of an aqueous 10% silica colloidal (produced by Shokubai Kasei of Japan and marketed under product code "No. SI-350") solution, 5 ml of an aqueous 5% copolymer solution was stirred to induce reaction. The resulting reaction solution and a mixed solution consisting of 4 ml of water and 1 g of sodium montmorillonite were mixed by stirring. The resulting mixture was dried in a drier at 110° C. for 1 day and then the dried mixture was fired at 500° C. for 3 hours. The dried mixture and the fired mass were tested by the nitrogen adsorption-desorption method for pore diameter, surface area, nitrogen capacity, specific volume, and porosity. Consequently, the pore diameter was found to be 3.0 and 3.1 nanometers, the surface area to be 292 and 304 m$^2$/g for the pore diameter of not less than 2 nanometers, the total surface area to be 403 and 443 m$^2$/g, the nitrogen capacity to be 0.21 and 0.24 cm$^3$/g, the specific volume to be 0.45 and 0.50 cm$^3$/g, and the porosity to be 0.47 and 0.48, respectively.

EXAMPLE 6

In 100 ml of an aqueous 10% methanol solution, 2 g of polyoxyethylene ethyl acrylate having a molecular weight of 1,000 and 0.2 g of trimethylaminopropylacrylamide quaternary ammonium chloride were dissolved and then 0.05 g of ammonium persulfate was dissolved. Then, the resulting solution was left standing for reaction at 80° C. for 3 hours. The resulting reaction solution was poured into 1,000 ml of methanol to induce precipitation. The precipitate was separated by filtration and then dried to produce a copolymer (ion-exchange capacity 283 meq./100 g.). In 5 ml of an aqueous 10% silica colloidal (produced by Shokubai Kasei of Japan and marketed under product code "No. SI-350") solution, 5 ml of an aqueous 5% copolymer solution was stirred to induce reaction. The resulting reaction solution and a mixed solution consisting of 4 ml of water and 1 g of sodium montmorillonite were stirred. The resulting mixture was dried at 110° C. for 1 day and then the dried mixture was fired at 500° C. for 3 hours. The fired mass was tested by the nitrogen adsorption-desorption method for pore diameter and other physical properties. Consequently, the pore diameter was found to be 3.0 nanometers, the surface area to be 290 m$^2$/g for the pore diameter of not less than 2 nanometers, the total surface area to be 398 m$^2$/g, the nitrogen capacity to be 0.22 cm$^3$/g, the specific volume to be 0.46 cm$^3$/g, and the porosity to be 0.48.

EXAMPLE 7

Fired masses were obtained by following the procedure of Example 5, except that the amount of trimethylaminoethyl acrylate quaternary ammonium chloride was varied. The fired masses were tested by the nitrogen adsorption-desorption method for pore diameter and other properties. The results were as shown in Table 1.

TABLE 1

| Change in physical properties with varying amount of quaternary ammonium salt | | | | |
|---|---|---|---|---|
| Quaternary ammonium salt (g) | Pore diameter (nanometer) | Surface area (m$^2$/g) | Specific volume (cm$^3$/g) | Porosity |
| 0.5 | 3.0 | 390 | 0.45 | 0.48 |
| 1.0 | 3.1 | 380 | 0.41 | 0.44 |
| 2.0 | 2.9 | 382 | 0.44 | 0.50 |
| 5.0 | 2.9 | 370 | 0.40 | 0.41 |
| 9.0 | 3.0 | 350 | 0.40 | 0.40 |

EXAMPLE 8

In 100 ml of water, 2 g of acrylamide and 0.2 g of trimethyl-aminoethyl acrylate ammonium chloride were dissolved and then 0.1 g of ammonium persulfate was dissolved. The resultant solution was left standing at 50° C. for 5 hours to effect copolymerization of the monomers. The resulting reaction solution was added to 1,000 ml of methanol to induce precipitation. The precipitate was separated and dried to produce a copolymer. In 100 ml of water, 10 g of this copolymer was dissolved.

In 2 ml of an aqueous 4% polyvinyl alcohol (polymerization degree 2,000) solution, 5 ml of the copolymer solution was stirred. The resulting solution and 5 ml of an aqueous 5% silica colloidal (produced by Shokubai Kasei of Japan and marketed under product code "No. SI-350") solution as an inorganic substance were mixed by stirring. In this solution, a solution obtained by stirring 1 g of montmorillonite in 5 ml of an aqueous 4% polymer (polymerization degree 2,000) solution was stirred. The resulting mixture was dried in a drier at 110° C. for 1 day and then the dried mixture was fired at 500° C. for 3 hours. The dried mixture and the fired mass were tested by the nitrogen adsorption-desorption method for pore diameter, surface area, nitrogen capacity, specific volume, and porosity. Consequently, the pore diameter was found to be 3.5 nanometers, the surface area to be 280 and 292 m$^2$/g for the pore diameter of not less than 2 nanometers, the total surface area to be 540 and 572 m$^2$/g, the nitrogen capacity to be 0.24 and 0.28 cm$^3$/g, the specific volume to be 0.51 and 0.65 cm$^3$/g, and the porosity to be 0.47 and 0.48, respectively.

EXAMPLE 9

In 100 ml of an aqueous 10% methanol solution, 2 g of hydroxyethyl acrylate and 0.5 g of trimethyl amino propyl acrylamide ammonium chloride were dissolved and then 0.1 g of ammonium persulfate was dissolved. The resulting solution was heated at 50° C. for 5 hours to effect copolymerization of the monomers. Five ml of the resulting solution and 2 ml of an aqueous 4% polyvinyl alcohol (polymerization degree 1,500) solution were mixed by stirring. The solution consequently produced and 5 ml of an aqueous 5% silica colloidal (produced by Shokubai Kasei of Japan and marketed under product code "No. SI-350") solution as an inorganic substance were mixed by stirring. The resulting solution and a solution obtained by stirring 1 g of montmorillonite in 5 ml of an aqueous 4% polyvinyl alcohol (polymerization degree 1,500) solution were mixed by stirring. The produced mixture was dried in a drier at 110° C. for 1 day and then the dried mixture was fired at 500° C. for 3 hours. The fired mass was tested by the nitrogen adsorption-desorption method for pore diameter and other properties. Consequently, the pore diameter was found to be 3.1 nanometers on the average, the surface area to be 285 m²/g for the pore diameter of not less than 2 nanometers, the total surface area to be 590 m²/g, the nitrogen capacity to be 0.25 cm³/g, the specific volume to be 0.55 cm³/g, and the porosity to be 0.45.

EXAMPLE 10

In 100 ml of water, 2 g of vinyl pyridine and 0.2 g of trimethylaminoethyl acrylate ammonium chloride were dissolved and then 0.2 g of ammonium persulfate was dissolved. The resulting solution was heated at 50° C. for 5 hours to effect copolymerization of the monomers.

In 1 ml of an aqueous 10% polyvinyl alcohol (polymerization degree 2,000) solution, 5 ml of the resulting solution was stirred. The solution consequently obtained and 5 ml of an aqueous 5% silica colloidal (produced by Shokubai Kasei of Japan and marketed under product code "No. SI-350") solution as an inorganic substance were mixed by stirring. To this solution was added a solution obtained by stirring 1 g of montmorillonite in 4 ml of water. The resulting mixture was dried at 110° C. for 1 day and then the dried mixture was fired at 500° C. for 3 hours. The fired mass consequently obtained was tested by the nitrogen adsorption-desorption method for pore diameter and other properties. Consequently, the pore diameter was found to be 3.3 nanometers on the average, the surface area to be 295 m²/g for the pore diameter of not less than 2 nanometers, the total surface area to be 351 m²/g, the nitrogen capacity to be 0.28 cm³/g, the specific volume to be 0.52 cm³/g, and the porosity to be 0.54.

What is claimed is:

1. A method for producing a microporous separating material having a pore diameter of not less than 3 nanometers, comprising the steps of:
   mixing at least one basic water-soluble macromolecular substance selected from the group consisting of chitosans, polyacrylamides, polyvinyl pyridines, polyvinyl pyrrolidones, polyvinyl alcohols and polyethylene oxides, to which trimethyl ammonium salt has been added, with colloidal silica and water to obtain a first mixture,
   mixing said first mixture with at least one smectite selected from the group consisting of montomorillonites, bentonites, chlorites, beidellites, hectorites and synthetic micas to obtain a second mixture containing 0.4 to 30 ml of said water per gram of said smectite, 0.01 to 10% by weight of said colloidal silica based on said smectite, and 0.1 to 20% by weight of said basic water-soluble macromolecular substance based on said colloidal silica,
   stirring and then drying said second mixture, and firing the resultant dried mixture.

2. The method of claim 1, wherein said drying is conducted at a temperature in the range of 30° to 110° C. and said firing is conducted at a temperature in the range of 300° to 1,000° C.

3. A method for producing a microporous separating material having a pore diameter of not less than 3 nanometers, comprising the steps of:
   adding (a) colloidal silica and (b) at least one smectite selected from the group consisting of montmorillonites, bentonites, chlorites, beidellites, hectorites and synthetic micas separately to an aqueous solution containing a basic macromolecular substance produced by polymerization of (i) a polyoxyethylene alkylvinyl monomer of the general formula:

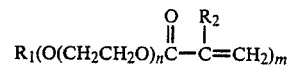

wherein $R_1$ is one member selected from the group consisting of $CH_3$, $CH_2$—$CH_3$, $CH_2$—$CH_2$—$CH_3$, $CH_3C_6H_5$ and $(CH_3)_2C_6H_5$, $R_2$ is one member selected from the group consisting of H and $CH_3$, n is an integer of from 10 to 1,000, and m is 1 or 2, with (ii) a basic vinyl monomer of the general formula:

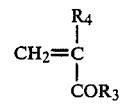

wherein $R_3$ is one member selected from the group consisting of $ON(CH_3)_3Cl$, $OC_2H_4N(CH_3)_3Cl$, $NHC_3H_6N(CH_3)_3Cl$, $ON(CH_3)_2CH_2CH_2OH.OH$, $OC_2H_4N(CH_3)_2CH_2CH_2OH.OH$ and $NHC_3H_6N(CH_3)_2CH_2CH_2OH.OH$, and $R_4$ is one member selected from the group consisting of H and $CH_3$, to obtain a mixture containing 0.4 to 30 ml of water per gram of said smectite, 0.01 to 10% by weight of said colloidal silica based on said smectite, and 0.1 to 20% by weight of said basic macromolecular substance based on said colloidal silica,
   stirring and then drying said mixture, and firing the resultant dried mixture.

4. The method of claim 3, wherein said drying is conducted at a temperature in the range of 30° to 110° C. and said firing is conducted at a temperature in the range of 300° to 1,000° C.

5. A method for producing a microporous separating material having a pore diameter of not less than 3 nanometers, comprising one steps of:
   mixing (a) a basic water-soluble macromolecular substance produced by copolymerizing (i) one halide of a quaternary ammonium salt selected from the group consisting of pyridinium butyl bromides, trimethylaminoethyl acrylate ammonium chlorides and trimethylaminopropyl acrylamide ammonium chlorides, and (ii) one member selected from the group consisting of water-soluble acrylamides, vinyl pyrrolidones, vinyl pyridines, dimethylaminoethyl acrylates and hydroxyethyl acrylates with (b) at least one water-soluble macromolecular substance selected from the group consisting of celluloses, polyvinyl alcohols, polyethylene oxides and polyacrylamides to obtain a first mixture as an aqueous solution,
   mixing said first mixture with colloidal silica and at least one smectite selected from the group consisting of montmorillonites, bentonites, chlorites, beidellites, hectorites and synthetic micas to obtain a second mixture containing 0.4 to 30 ml of water per gram of said smectite, 0.01 to 10% by weight of said colloidal silica based on said smectites and 0.1 to 20% by weight of said basic water-soluble macromolecular substance based on said colloidal silica,
   stirring and then drying said second mixture, and firing the resultant dried mixture.

6. The method of claim 5, wherein said drying is conducted at a temperature in the range of 30° to 110° C. and said firing is conducted at a temperature in the range of 300° to 1,000° C.

* * * * *